(12) United States Patent
Kim et al.

(10) Patent No.: US 6,423,957 B1
(45) Date of Patent: Jul. 23, 2002

(54) CMOS IMAGE SENSOR HAVING AUTOMATIC REFERENCE VOLTAGE CONTROLLER

(75) Inventors: Chan-Ki Kim; Kang-Jin Lee, both of Kyoungki-Do (KR)

(73) Assignee: Hyundai Electronics Industries Co., Ltd. (KR)

( * ) Notice: Subject to any disclaimer, the term of this patent is extended or adjusted under 35 U.S.C. 154(b) by 0 days.

(21) Appl. No.: 09/476,427

(22) Filed: Dec. 30, 1999

(30) Foreign Application Priority Data

Dec. 30, 1998 (KR) .............................. 98-61046

(51) Int. Cl.[7] .............................................. H04N 5/335
(52) U.S. Cl. ..................................... 250/208.1; 348/308
(58) Field of Search ........................... 250/208.1, 214 A; 348/300, 301, 308

(56) References Cited

U.S. PATENT DOCUMENTS 5,877,715 A * 3/1999 Gowda et al. ............... 341/122
6,115,066 A * 9/2000 Gowda et al. ............... 348/308

\* cited by examiner

*Primary Examiner*—Stephone Allen
*Assistant Examiner*—Christopher W. Glass
(74) *Attorney, Agent, or Firm*—Blakely Sokoloff Taylor & Zafman

(57) ABSTRACT

A CMOS image sensor based on a correlated double sampling method includes a pixel array having M×N unit pixels, arranged in a matrix, for sensing an image to generate an analog image data with a reset voltage level and a data voltage level as an output signal, a ramp voltage generator for generating a updated reference voltage in response to a control signal, a comparator for comparing the reset voltage level with the reference voltage level, a double buffer for storing the digital value, and a reference voltage control means for comparing the reference voltage with the reset voltage level to generate the control signal.

7 Claims, 6 Drawing Sheets

US 6,423,957 B1

CMOS IMAGE SENSOR HAVING AUTOMATIC REFERENCE VOLTAGE CONTROLLER

FIELD OF THE INVENTION

The present invention relates to a CMOS image sensor; and more particular, to a CMOS image sensor having an automatic reference voltage controller, thereby preventing an erroneous correlated double sampling (CDS) operation.

DESCRIPTION OF THE PRIOR ART

Generally, an image sensor is an apparatus to capture images using light sensing semiconductor materials. The image sensor includes a pixel array which contains a plurality of image sensing elements, e.g., photodiode and receives light from an object to generate an electric image signal.

FIG. 1 is a block diagram illustrating a CMOS (complementary metal oxide semiconductor) image sensor.

Referring to FIG. 1, the CMOS image sensor includes a control and system interface unit 10 for controlling the image sensor by controlling control signals, a pixel array 20 and an analog-to-digital converter 30 for converting an analog image data from the pixel array into a digital image data. Also, the analog-to-digital converter 30 includes a ramp voltage generator 31 for generating a reference voltage with a predetermined slope, a comparator 32 for comparing the reference voltage with the analog image data to generate a digital image data, and a double buffer 40 for storing the digital image data.

The pixel array 20 including M×N unit pixels, arranged in a matrix, senses images from an object. The image sensor generally employs a correlated double sampling (hereinafter, referred to as a CDS), to thereby obtain high picture quality under the control of the control and system interface unit 10. In order to implement the CDS, each of the unit pixels includes, e.g., a photodiode and four transistors, respectively. Also, the four transistors in the unit pixel include a transfer transistor, a reset transistor, a drive transistor and a select transistor. According to the CDS, the unit pixel outputs a reset voltage level as a unit pixel output signal from a voltage source by turning on the select transistor while the reset transistor is kept on a turned-on state under the control of the control and system interface unit. Also, the unit pixel provides a data voltage level as another unit pixel output signal from the photodiode by turning on and off the transfer transistor in a turned-off state of the reset transistor and reading out the photoelectric charges generated in the photodiode under the control of the control and system interface unit. As a result, an unexpected voltage in the unit pixel can be effectively removed and a net image data value can be obtained by using the reset voltage level and the data voltage level as unit pixel output signals.

FIG. 2 is a circuit diagram illustrating a CMOS image sensor core. The core circuit includes a unit pixel 200, a comparator 320 and a unit latch circuit 400, and FIG. 3 is a plot illustrating an operation of a comparator and a double buffer shown in FIG. 2. That operation of the image sensor core is disclosed in a copending commonly owned application, U.S. Ser. No. 09/258,448, entitled "CMOS IMAGE SENSOR WITH TESTING CIRCUIT FOR VERIFYING OPERATION THEREOF" filed on Feb. 26, 1999. Therefore, a detailed description will be omitted.

However, the conventional analog-to-digital conversion is carried out by dropping down the reference voltage at a predetermined rate without any consideration of situation. Therefore, it is difficult to adjust the reference voltage level according to various situations such as an offset, light intensity and the like.

SUMMARY OF THE INVENTION

It is, therefore, an object of the present invention to provide a CMOS image sensor having a reference voltage controller, in which an erroneous correlated double sampling (CDS) operation is prevented.

In accordance with an embodiment of the present invention, there is provided a CMOS image sensor based on a correlated double sampling method, comprising: a pixel array having M×N unit pixels, arranged in a matrix, for sensing an image to generate an analog image data, wherein the analog image data includes a reset voltage level and a data voltage level as an output signal; a ramp voltage generator for generating a updated reference voltage in response to a control signal; a comparator for comparing the reset voltage level with the reference voltage level; a double buffer for storing the digital value; and a reference voltage control means for comparing the reference voltage with the reset voltage level to generate the control signal.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
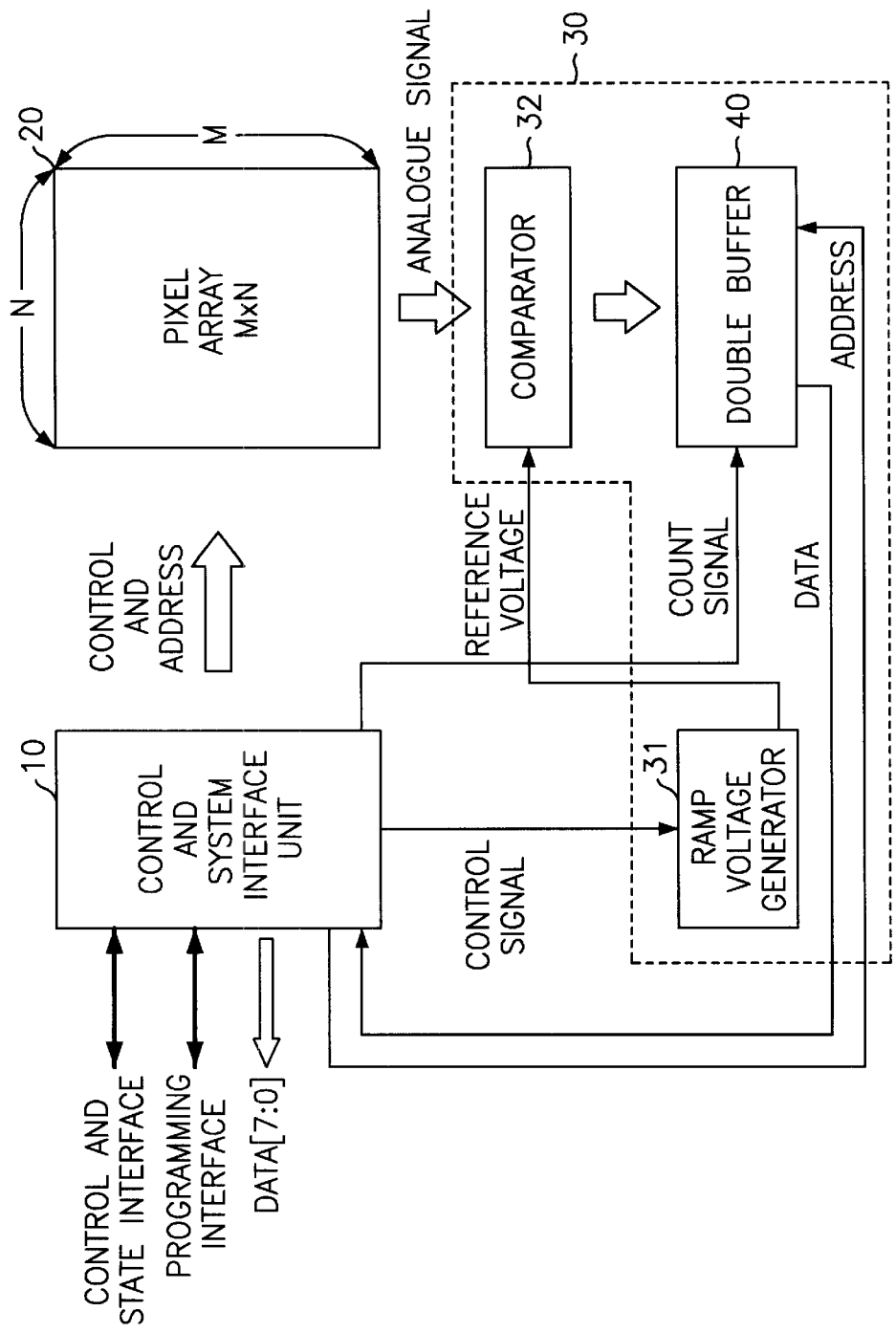
FIG. 1 is a block diagram illustrating a CMOS image sensor.
Figure 2:
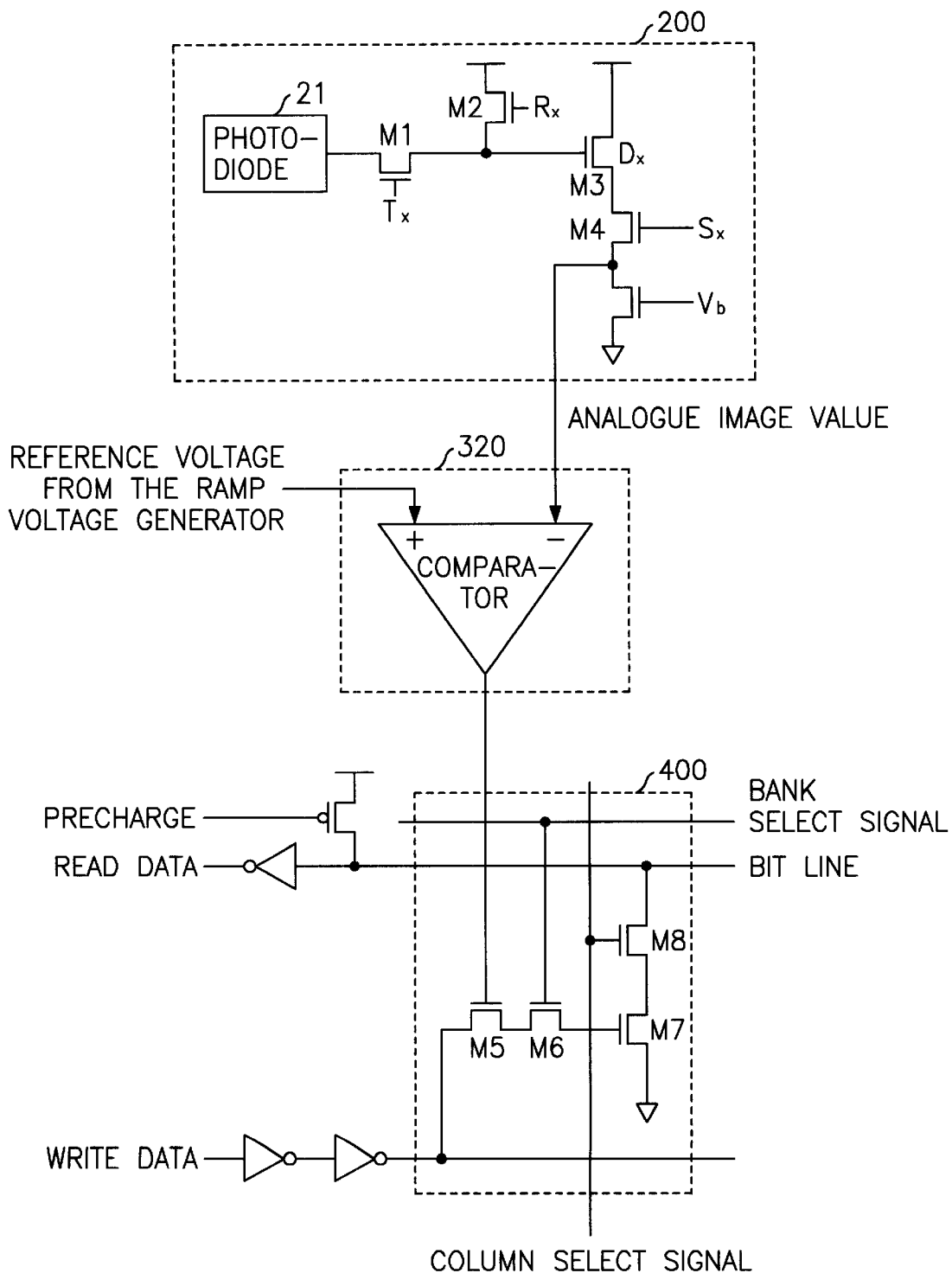
FIG. 2 is a circuit diagram illustrating a CMOS image sensor core.
Figure 3:
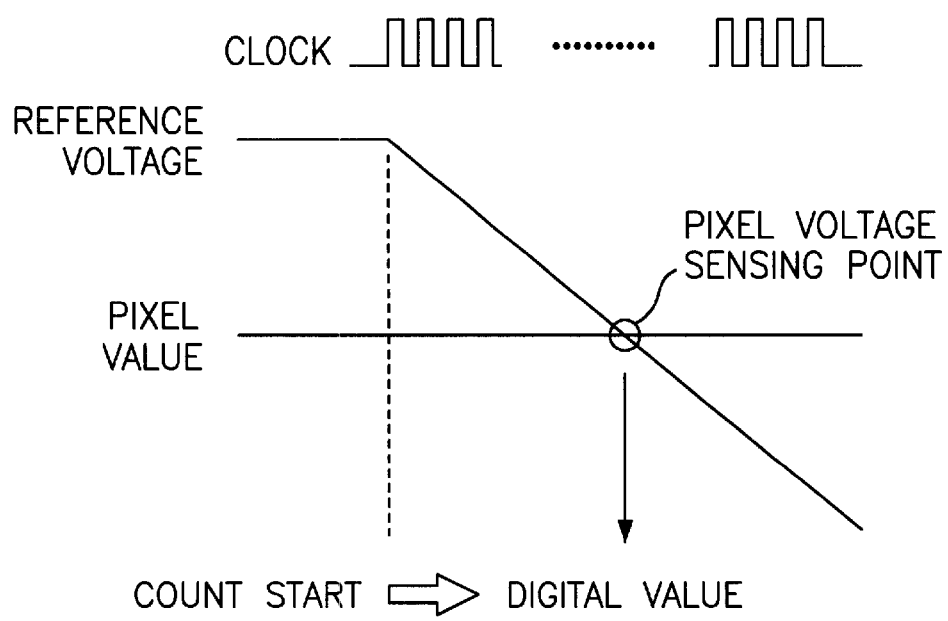
FIG. 3 is a diagram illustrating an operation of a comparator and a double buffer shown in FIG. 2.
Figure 4:
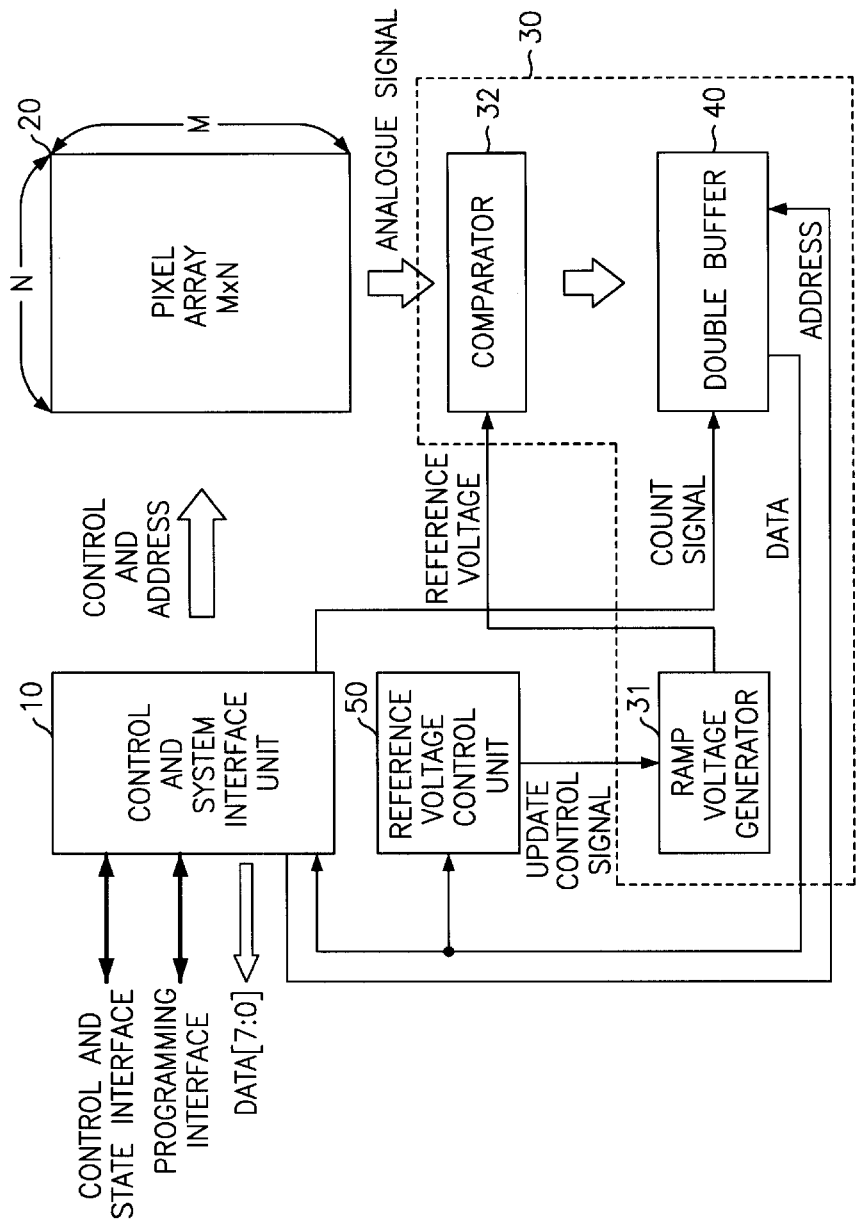
FIG. 4 is a block diagram illustrating a CMOS image sensor having a reference voltage control unit according to the present invention.

FIG. 4 is a block diagram illustrating a CMOS image sensor having an automatic reference voltage control unit according to the present invention.

A control and system interface unit 10 plays a role of interface to an external system and a pixel array 20 includes an M×N unit pixels, arranged in a matrix, for sensing an image. An analog-to-digital converter 30 converts an analog image data from the pixel array 20 into a digital image data to be processed through a digital system. Also, the analog-to-digital converter 30 includes a ramp voltage generator 31 for generating a reference voltage with a predetermined slope, a comparator 32 for comparing the analog image data from the pixel array 20 with the reference voltage from the ramp voltage generator 31, and a double buffer 40 for storing the digital image data. Furthermore, in order to control the reference voltage which is necessary to convert the analog image data into the digital image data, the CMOS image sensor according to the present invention includes a reference voltage control unit 50. The automatic reference voltage control unit 50 performs a counting operation to the reset voltage level to control the reference voltage according to a resultant count value.

Figure 5A:
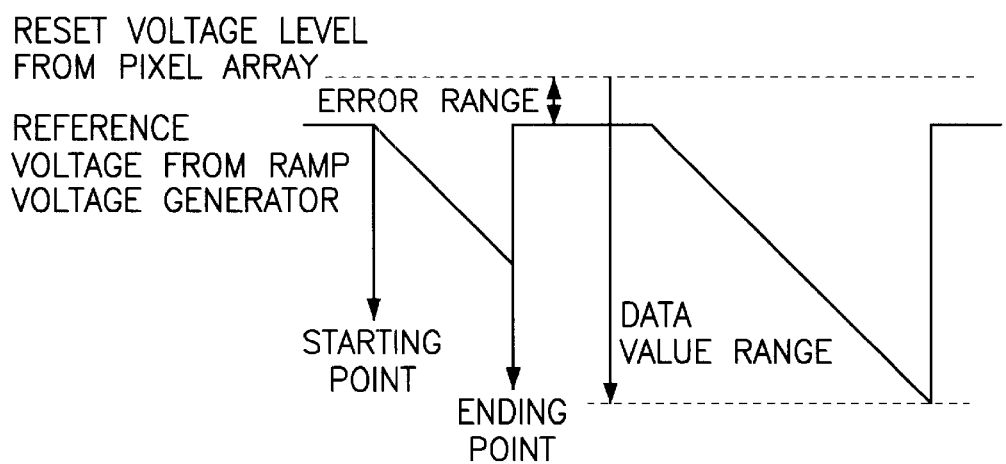
FIGS. 5A and 5B are diagrams explaining erroneous CDS operations.
Figure 5B:
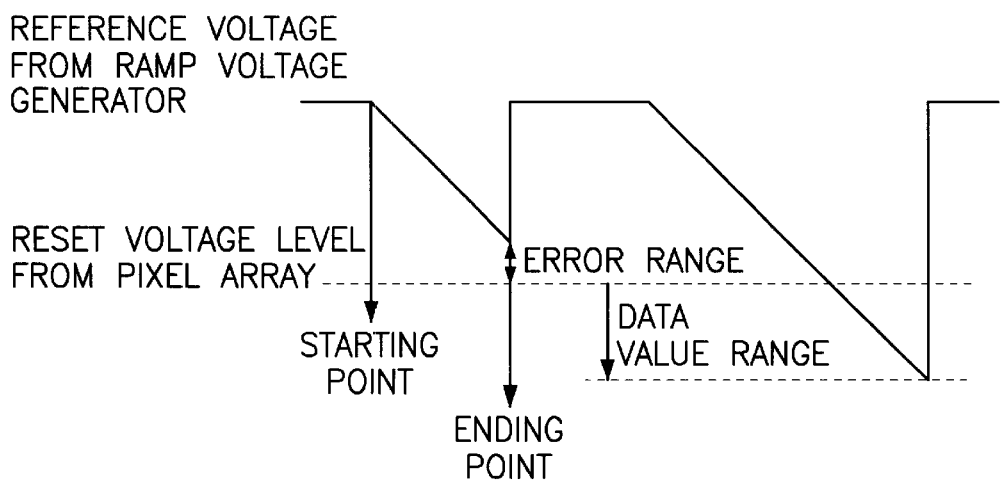

FIGS. 5A and 5B are diagrams for explaining an erroneous CDS operation. As shown in FIGS. 5A and 5B, in case where the reset voltage level from the pixel array is higher or lower than a level of a starting point or a level of an ending point of the reference voltage from the ramp voltage generator, respectively, it is difficult to achieve a correct CDS operation to a pixel which generates a pixel value of an error range.

Accordingly, in case of FIG. 5A, it is required that the reference voltage be raised as much as the error range, and in similar manner, in case of FIG. 5B, it is required that the reference voltage be dropped down as much as error range. The reference voltage control unit 50 performs these correction operations.

Figure 6:
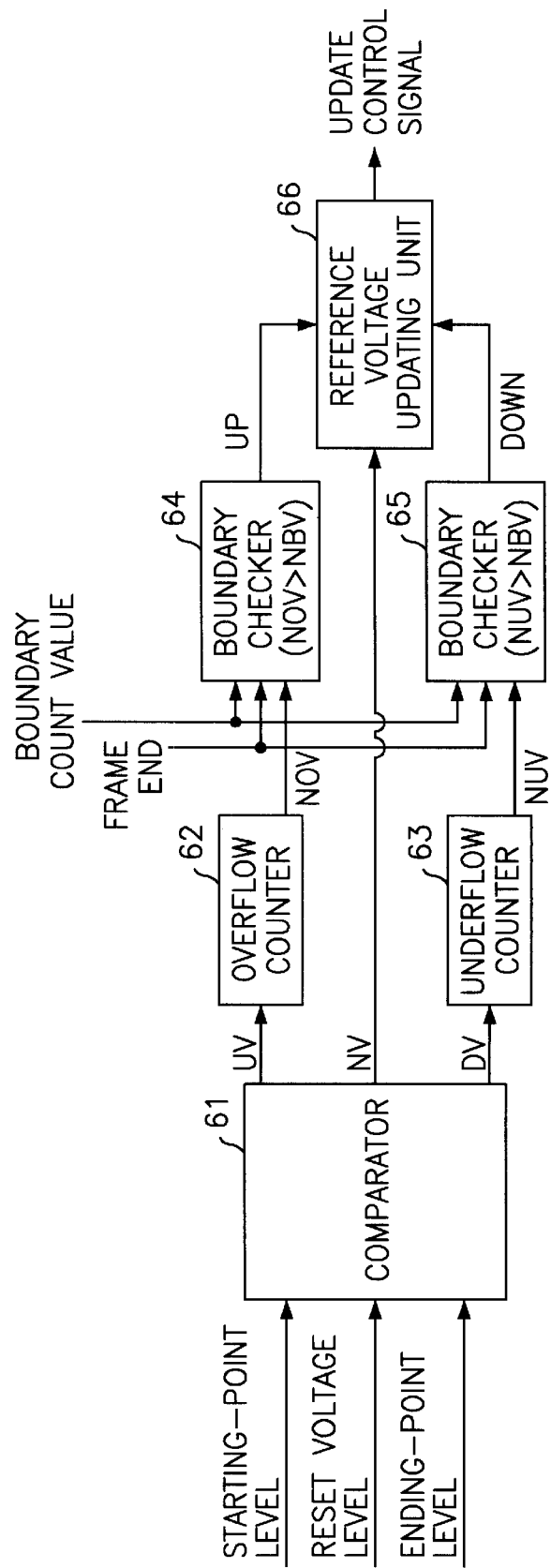
FIG. 6 is a block diagram illustrating a reference voltage control unit shown in FIG. 4 according to the present invention.

FIG. 6 is a block diagram illustrating a reference voltage control unit according to the present invention.

Referring to FIG. 6, a comparator 61 compares the reset voltage level from the double buffer (40, in FIG. 4) with the reference voltage from the ramp voltage generator (31, in FIG. 4). As a result of comparison, in case where the reset voltage level is higher than the level of the starting point of the reference voltage, the comparator 61 outputs a first count control signal UV, and in case where the reset voltage level is lower than the level of the ending point of the reference voltage, the comparator 61 outputs a second count control signal DV.

A overflow counter 62 performs a counting operation in response to the first count control signal UV to generate a first count value NOV corresponding to the numbers of the pixels having the reset voltage level higher than the level of the starting point of the reference voltage. In similar manner, a underflow counter 63 performs a counting operation in response to the second count control signal DV to generate a second count value NUV corresponding to the numbers of the pixels having the reset voltage level lower than the level of the ending point of the reference voltage.

A boundary checker 64 compares the first count value NOV with a predetermined boundary count value NBV, wherein the predetermined boundary count value NBV is inputted by a user. As a result of the comparison, in case where the first count value NOV is greater than the predetermined boundary count value, the first boundary checker 64 generates a first reference voltage control signal UP in response to a frame end signal. In similar manner, a second boundary checker 65 compares the second count value NUV with the predetermined boundary count value NBV. As a result of the comparison, in case where the second count value is greater than the predetermined boundary count value, the second boundary checker 65 generates a second reference voltage control signal DOWN in response to a frame end signal.

A reference voltage updating unit 66 controls the ramp voltage generator (31, in FIG. 4) in response to the first and second reference voltage control signals UP and DOWN. That is, the ramp voltage generator raises the reference voltage in response to the first reference voltage control signal UP and drops down the reference voltage in response to the second reference voltage control signal DOWN. At this time, in case where the reset voltage level is between the levels of the starting point and the ending point of the reference voltage, the comparator 61 generates a normal signal NV to the reference voltage updating unit 66, the reference voltage is not changed.

As described above, controlling the reference voltage when the numbers of the pixels in the error ranges is above the predetermined numbers, the CMOS image sensor can secure the correct CDS operation according to the distribution of the reset voltage levels.

While the present invention has been described with respect to certain preferred embodiments only, other modifications and variation may be made without departing from the spirit and scope of the present invention as set forth in the following claims.

What is claimed is:

1. A CMOS image sensor based on a correlated double sampling method, comprising:

a pixel array having M×N unit pixels, arranged in a matrix, for sensing an image to generate a pixel value, wherein the pixel value includes a reset voltage level and a data voltage level as an output signal;

a ramp voltage generator for generating an updated reference voltage in response to a control signal;

a comparator for comparing the reference voltage with the pixel value to generate a digital value corresponding to the pixel value;

a double buffer for storing the digital value; and a reference voltage control means for comparing the reference voltage with the reset voltage level to generate the control signal.

2. The CMOS image sensor as recited in claim 1, the reference voltage control means includes:

a first comparison means for comparing the reset voltage level with a starting level and an ending level of the reference voltage to generate count control signals, wherein the count control signals includes a first count control signal and a second count control signal;

a first counting means for performing a counting operation in response to the first count control signal;

a second counting means for performing a counting means operation in response to the second count control signal;

a second comparison means for comparing a count value of the first counting means with a predetermined boundary value to generate a first control signal;

a third comparison means for comparing a count value of the second counting means with a boundary value to generate a second control signal; and a reference voltage updating means for controlling the ramp voltage generator in response to the first and second control signal.

3. The CMOS image sensor as recited in claim 2, wherein the predetermined boundary value is inputted by a user.

4. The CMOS image sensor as recited in claim 2, wherein the first control signal is generated when the starting level of the reference voltage is lower than the reset voltage level.

5. The CMOS image sensor as recited in claim 4, wherein the second control signal of the reference voltage is generated when the ending level is higher than the reset voltage level.

6. The CMOS image sensor as recited in claim 4, wherein the ramp voltage generator generates the updated reference voltage by raising the level of the reference voltage at a predetermined level.

7. The CMOS image sensor as recited in claim 5, wherein the ramp voltage generator generates the updated reference voltage by dropping down the level of the reference voltage at a predetermined level.

* * * * *